United States Patent
Vladimir

(10) Patent No.: US 7,555,583 B2
(45) Date of Patent: Jun. 30, 2009

(54) CONTROL SYSTEM HAVING MAIN CONTROLLER AND PERIPHERAL CONTROLLERS, AND BUS CONNECTION METHOD

(75) Inventor: Gaidukov Vladimir, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 11/189,826

(22) Filed: Jul. 27, 2005

(65) Prior Publication Data

US 2006/0136609 A1    Jun. 22, 2006

(30) Foreign Application Priority Data

Jul. 28, 2004    (KR)    ............ 10-2004-0059061

(51) Int. Cl.
G06F 13/00    (2006.01)

(52) U.S. Cl. .................................. 710/104; 710/9

(58) Field of Classification Search ................ 710/305, 710/306, 1, 4, 8–10, 104; 379/333; 370/401, 370/402; 711/154; 709/253
See application file for complete search history.

(56) References Cited

U.S. PATENT DOCUMENTS

| | | | | |
|---|---|---|---|---|
| 3,225,334 | A * | 12/1965 | Fields et al. .................... | 710/1 |
| 4,623,760 | A * | 11/1986 | Binkerd et al. ............... | 379/232 |
| 4,775,931 | A | 10/1988 | Dickie et al. | |
| 5,054,020 | A * | 10/1991 | Meagher ..................... | 370/305 |
| 5,140,590 | A * | 8/1992 | Gertsman et al. ........... | 370/384 |
| 5,396,654 | A | 3/1995 | Tripp et al. | |
| 6,275,889 | B1 * | 8/2001 | Saito .......................... | 710/313 |
| 6,378,000 | B1 * | 4/2002 | Akatsu et al. ............... | 709/245 |
| 6,914,181 | B2 * | 7/2005 | Toshitani .................... | 84/645 |
| 7,062,332 | B2 * | 6/2006 | Matsuda ..................... | 700/19 |
| 7,181,554 | B2 * | 2/2007 | Matsuda ..................... | 710/104 |
| 2001/0005844 | A1 * | 6/2001 | Kobayashi .................. | 707/1 |
| 2002/0004872 | A1 * | 1/2002 | Ono ........................... | 710/305 |
| 2002/0042855 | A1 * | 4/2002 | Takayama et al. .......... | 710/105 |
| 2003/0159570 | A1 * | 8/2003 | Toshitani .................... | 84/645 |
| 2004/0019732 | A1 * | 1/2004 | Overtoom et al. .......... | 710/313 |
| 2004/0267915 | A1 * | 12/2004 | Henry ........................ | 709/223 |
| 2005/0021852 | A1 * | 1/2005 | Accarie et al. ............. | 709/245 |
| 2006/0136609 | A1 * | 6/2006 | Vladimir ..................... | 710/8 |

(Continued)

FOREIGN PATENT DOCUMENTS

CN    1045882    10/1990

(Continued)

OTHER PUBLICATIONS

"Regional pole placement via low-order controllers with extensions to simultaneous stabilization" by Wang et al. (abstract only) Publication Date: Jun. 25-27, 2001.*

(Continued)

Primary Examiner—Glenn A Auve
(74) Attorney, Agent, or Firm—Stanzione & Kim LLP

(57) ABSTRACT

A control system to reduce a load to a system bus by interconnecting a main controller and two or more peripheral controllers in the control system, and a method thereof. Different addresses are assigned to the main controller and the two or more peripheral controllers, respectively. The main controller and the two or more peripheral controllers, to which the different addresses are respectively assigned, are interconnected using one serial bus.

23 Claims, 7 Drawing Sheets

U.S. PATENT DOCUMENTS

2006/0236043 A1* 10/2006 Ogura et al. ............... 711/154

FOREIGN PATENT DOCUMENTS

| CN | 1282926    | 2/2001  |
|----|------------|---------|
| JP | 63-292359  | 11/1988 |
| JP | 02-87283   | 3/1990  |
| JP | 2001-53925 | 2/2001  |
| KR | 2004-32732 | 4/2004  |

OTHER PUBLICATIONS

Anderson, Don; FireWire System Architecture: Second Edition IEEE 1394a; 25-27,42-44,270-272,369-372,383; Aug. 1999.*
IEEE 1394-1995 Specification; Sections 7.3-8.5; pp. 181-249; The Institute of Electrical and Electronics Engineers, Inc.; 1995.*
Chinese Office Action dated Mar. 2, 2007 issued in CN 200510087562.5.
Korean Office Action dated Feb. 13, 2006 issued in KR 2004-59061.

* cited by examiner

CONTROL SYSTEM HAVING MAIN CONTROLLER AND PERIPHERAL CONTROLLERS, AND BUS CONNECTION METHOD

CROSS-REFERENCE TO RELATED APPLICATIONS

This application claims the benefit under 35 U.S.C. § 119(a) from Korean Patent Application No. 2004-59061, filed on Jul. 28, 2004, in the Korean Intellectual Property Office, the disclosure of which is incorporated herein in its entirety by reference.

BACKGROUND OF THE INVENTION

1. Field of the Invention

The present general inventive concept relates to a control system including a main controller and at least one peripheral controller. More specifically, the present general inventive concept relates to a method and system to reduce a load to a system bus in a control system.

2. Description of the Related Art

General computer architecture, such as a workstation, includes a bus that interconnects function blocks, such as a central processing unit (CPU), applications, and attachments (devices). Each block functions as a master or a slave.

FIG. 1 is a construction of a conventional multifunctional peripheral (MFP). The conventional MFP includes a main controller 10 having a CPU 110, and devices 20 through 60. The main controller 10 includes the CPU 110 having a memory therein, an internal device 130, and a plurality of channels 120 through 12N. The CPU 110 is connected with the plurality of channels 120 through 12N over a system bus 150.

The devices 20 through 60 each include a controller (not shown), to respectively control their components. Hereinafter, the controllers in the devices 20 through 60 are referred to as "peripheral controllers." The channels 120 through 12N and the devices 20 through 60 are interconnected using serial lines. As shown in FIG. 1, the control system of the conventional MFP includes the main controller 10, and the peripheral controllers of the devices 20 through 60.

The CPU 110 processes graphic data and controls overall operations of the system. The devices 20 through 60 represent peripherals in the MFP. For instance, the first device 20 may be a user interface, such as a display and an input part (keyboard), the second device 30 may be a duplex document feeder, the third device 40 may be a finisher, the fourth device 50 may be a toner cartridge, and the N-th device 60 may be a printer engine. As mentioned above, the devices 20 through 60 each include a controller.

Typically, the devices 20 through 60 function independently with respect to each other to reduce a load to the CPU 110, but do not function completely independently from the CPU 110. The devices 20 through 60 can receive or transfer required data from or to the CPU 110. The CPU 110 and the devices 20 through 60 communicate data using the system bus 150 and the serial lines.

The following explanation is directed to the system bus 150 and the serial lines used to transfer data between the CPU 110 and the devices 20 through 60. In FIG. 1, the system bus 150 guarantees a high data transfer rate, and the serial lines guarantee a relatively low data transfer rate as compared with the system bus 150.

The first device 20 is connected to the CPU 110 over the first channel 120, and the second device 30 is connected to the CPU 110 over the second channel 121. The third device 40 is connected to the CPU 110 over the third channel 122, and the fourth device 50 is connected to the CPU 110 over the fourth channel 123. The N-th device 60 is connected to the CPU 110 over the N-th channel 12N.

Data transmitted to the CPU 110 can be categorized according to data volume, into control data having small data volume and graphic data having large data volume. Generally, the devices 20 through 60 transmit the control data having small data volume, and a scanner 70 transfers graphic data having large data volume to the CPU 110.

The devices 20 through 60 are connected to the channels 120 through 12N using the serial lines providing a low data transfer rate, and the scanner 70 is connected with a bridge 140 using a parallel bus 80 providing a high data transfer rate. The scanner 70 is connected this way because the scanner 70 requires a bus that can guarantee a high data transfer rate so as to transfer scanned data to the CPU 110. The bridge 140 is provided for input and output processes with a direct memory access (DMA) controller, which is assigned with certain functions of the main controller 10.

FIGS. 2A and 2B illustrate conventional structures of the channels 120 through 12N of FIG. 1.

FIG. 2A depicts a universal asynchronous receiver/transmitter (UART). The UART is provided to the channels 120 through 12N and the devices 20 through 60. Referring to FIG. 2A, the UART interfaces data, chip select (CS), read and write (R/W), and clock (CLK) signals. That is, the CS signals instruct the UART to turn on or off the channels 120 through 12N. The R/W signals instruct the UART to transfer data to the channels 120 through 12N or to read data from the channels 120 through 12N. The UART synchronizes the channels 120 through 12N using the received CLK signals. The channels 120 through 12N are connected to the respective devices 20 through 60 using the serial lines.

FIG. 2B depicts a register that transmits and receives three control data signals. Unlike the control data transmitted and received using the single serial line in FIG. 2A, the control data in FIG. 2B are transmitted and received using respective dedicated lines.

Referring back to FIG. 1, as the conventional MFP utilizes the plurality of channels 120 through 12N, overload is caused to the system bus 150 interconnecting the CPU 110 and the channels 120 through 12N. In this situation, it is hard to efficiently transfer the graphic data to the CPU 110 via the bridge 140. Furthermore, as the number of the devices increases, the number of channels also increases. The increased number of the devices also increase a load to the system bus 150. Thus, a method is required to increase the number of devices without changing the control system and without increasing a load of a system bus.

SUMMARY OF THE INVENTION

The present general inventive concept provides a method and system to reduce overload at a system bus interconnecting a CPU and channels. Accordingly, the present general inventive concept increases bus distance and data reliability and reduces total length of cables, noise and error occurrence.

The present general inventive concept also provides a method and system to increase a number of devices connected to a CPU without changing a control system thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method to interconnect a main controller and at least two peripheral controllers using a bus in a control system, the method including assigning different addresses to the main controller and the at least two peripheral controllers, respectively, and interconnecting the main controller and the at least two peripheral controllers, to which the different addresses are respectively assigned using one serial bus.

The serial bus can forward data in two directions between the main controller and the at least two peripheral controllers. The main controller can generate data including an address assigned to a peripheral controller which receives the data, and can transfer the generated data to the at least two peripheral controllers using the serial bus.

The at least two peripheral controllers can operate as instructed by the received data when the address contained in the data received over the serial bus is the same as the assigned addresses. The at least two peripheral controllers can discard the received data when the addresses contained in the received data is different from the assigned addresses. An additional bus can be used to connect with an additional peripheral controller that transmits and receives data having a volume exceeding a predetermined value to and from the main controller.

The foregoing and/or other aspects of the present general inventive concept are also achieved by providing a control system including a main controller to which a unique address is assigned, and at least two peripheral controllers interconnected with the main controller using one serial bus, and each assigned a unique address.

The main controller may comprise a central processing unit (CPU) to control the main controller, and an address serial bus (ASB) connected with the at least two peripheral controllers and assigned an address. The at least two peripheral controllers may each include an ASB to which a unique address is assigned.

BRIEF DESCRIPTION OF THE DRAWINGS

These and/or other aspects of the general inventive concept will become apparent and more readily appreciated from the following description of exemplary embodiments, taken in conjunction with the accompanying drawing figures of which.

DETAILED DESCRIPTION OF THE PREFERRED EMBODIMENTS

Figure 1:
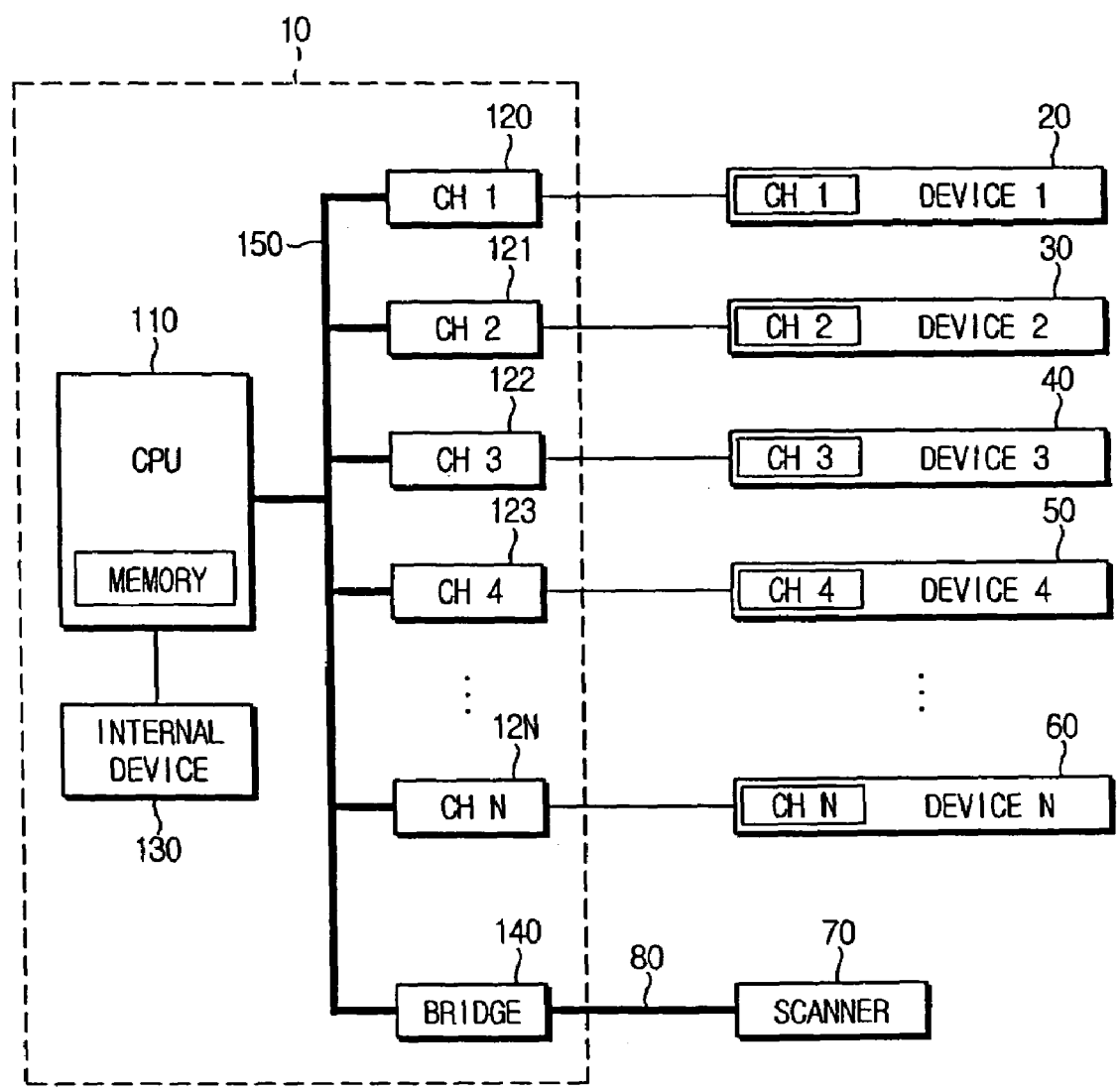
FIG. 1 illustrates a structure of a conventional multifunctional peripheral (MFP)
Figure 2A:
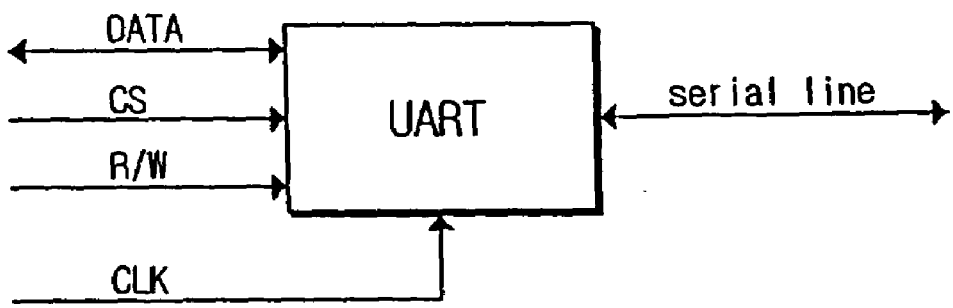
FIGS. 2A and 2B illustrate structures of channels of the conventional MFP of FIG. 1.
Figure 2B:
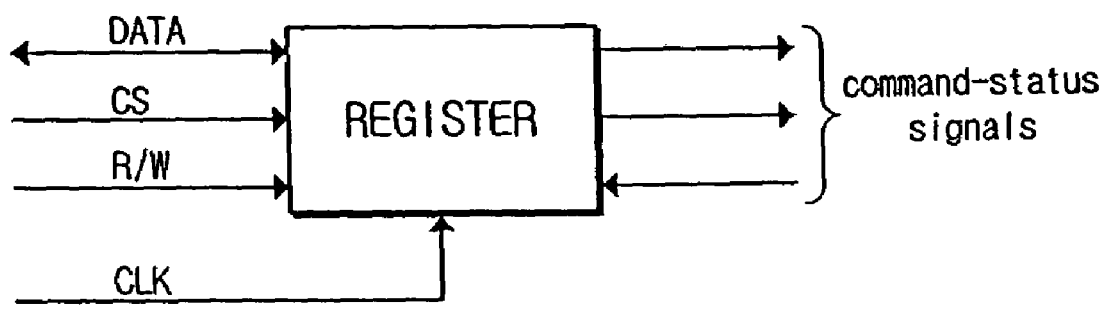

In the following description, like drawing reference numerals are used for the like elements even in different drawings. The matters defined in the description, such as detailed construction and element descriptions, are provided to assist in a comprehensive understanding of the general inventive concept. Also, well-known functions or constructions are not described in detail since they would obscure the general inventive concept in unnecessary detail.

A method according to an embodiment of the present general inventive concept can interconnect a main controller including a central processing unit (CPU), and a plurality of peripheral controllers using a single bus. Unique addresses are assigned to the main controller and the peripheral controllers, respectively, thus discriminating the controllers with respect to each other. Thus, the main controller and the peripheral controllers can communicate data with each other using the assigned addresses.

Figure 3:
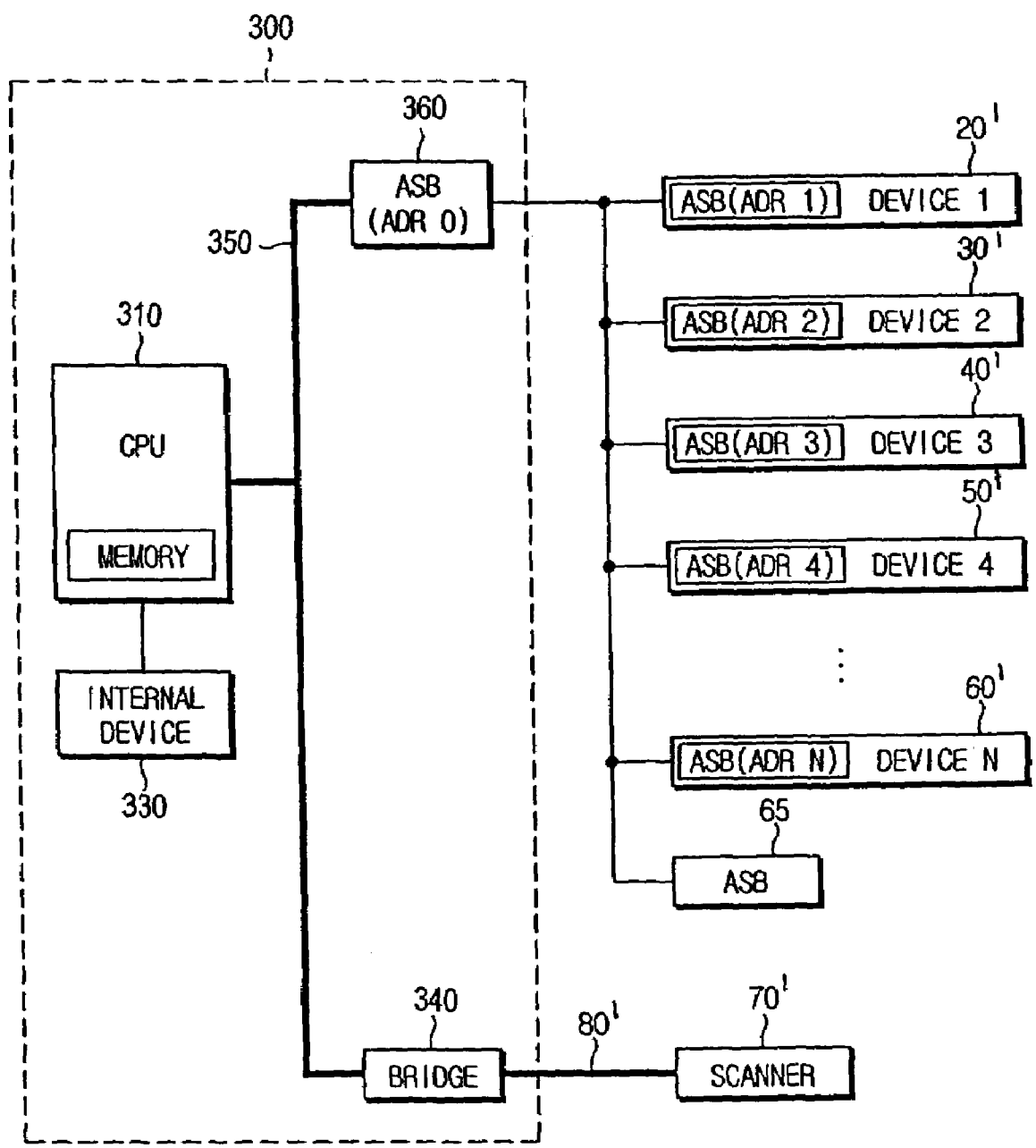
FIG. 3 illustrates a construction of an MFP according to an embodiment of the present general inventive concept.

FIG. 3 illustrates a construction of a multifunctional peripheral (MFP) according to an embodiment of the present general inventive concept. Referring to FIG. 3, the MFP includes a main controller 300 having a CPU 310, and a plurality of devices 20' through 60'. The main controller 300 includes the CPU 310 having a memory therein, an internal device 330, an address serial bus (ASB) 360, and a bridge 340. Although the main controller 300 can include other components, the description is limited to these components for brevity. The CPU 310 is connected to the ASB 360 and the bridge 340 over a system bus 350. The system bus 350, as illustrated in FIG. 3, is realized in a simpler structure than the system bus 150 of the conventional MFP of FIG. 1. As illustrated in FIG. 3, the CPU 310 and the ASB 360 are interconnected over the single system bus 350.

The devices 20' through 60' each include a respective ASB therein. According to an embodiment of the present general inventive concept, each of the ASBs is assigned a unique address. For example, the ASB 360 of the main controller 300 can be assigned an address (ADR) 0, the first device 20' can be assigned an ADR 1, the second device 30' can be assigned an ADR 2, the third device 40' can be assigned an ADR 3, the fourth device 50' can be assigned an ADR 4, and the N-th device 60' can be assigned an ADR N. An additional ASB 65 can be provided to the MFP to join an additional device thereto. Although only one additional ASB 65 is illustrated in FIG. 3, two or more additional ASBs can be provided according to a preference of a user. The devices 20' through 60' are connected with the ASBs using a serial line.

The bridge 340 is connected with a scanner 70' over a parallel bus 80'. Since the scanner 70' needs to transfer a large data volume to the CPU 310, it is required to connect to the bridge 340 over a bus having a high data transfer rate. Accordingly, the scanner 70' and the bridge 340 are interconnected over the parallel bus 80'. The bridge 340 is connected to the CPU 310 over the system bus 350.

The CPU 310 can generate a control data intended for a specific one of the devices 20'-60'. The CPU 310 generates a control data including the unique address assigned to the specific one of the devices 20'-60', and transfers the generated control data to the ASB 360 of the main controller 300. The ASB 360 of the main controller 300 then transmits the control data to each of the devices 20'-60'. Each device compares the respective address thereof with the address included in the control data. When the address of a respective device 20'-60' is the same as the address included in the control data, the respective device 20'-60' operates according to the control data, and when the address of a respective device 20'-60' is not the same as the address included in the control data, the respective device 20'-60' does not charge operation.

For example, when the CPU 310 generates a control data intended for the first device 20', the control data includes the ADR 1 corresponding to the first device 20'. The CPU 310 transfers the control data to the ASB 360 of the main controller. The ASB 360 transmits the received control data to the first device 20' through the N-th device 60'. Each of the first device 20' through the N-th device 60' receives the transmitted control data and compares the address included in the received control data with their respective assigned addresses. In this case, in the first device 20', the compared addresses will be found to be the same, and the first device 20' will operate using the received control data. In the second device 30' through the N-th device, the compared addresses will be found to be different from each other, and the second device 30' through the N-th device 60' will therefore not operate using the received control data. Thus, when the CPU 310 generates the control data intended for the first device 20', only the first device 20' receives the generated control data.

Each of the devices 20'-60' can generate status data intended for the CPU 310. For, example, when the first device 20' generates status data intended for the CPU 310, first device 20' generates a status data including an address 0, which is assigned to the ASB 360, and transmits the generated status data to the ASB 360 and the remaining devices 30'-60'. The ASB 360 stores the received status data in its buffer since the address 0 in the status data is the same as the assigned address of the ASB 360 of the main controller 300. The CPU 310 receives the status data over the system bus 350.

Figure 4A:
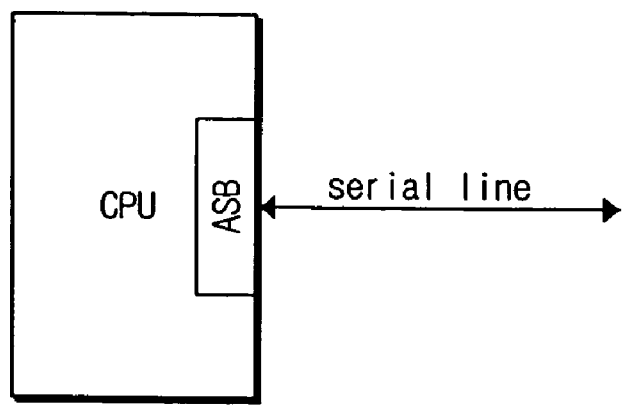
FIGS. 4A-4C illustrate structures of an ASB of the MFP of FIG. 3 according to various embodiments of the present general inventive concept.
Figure 4B:
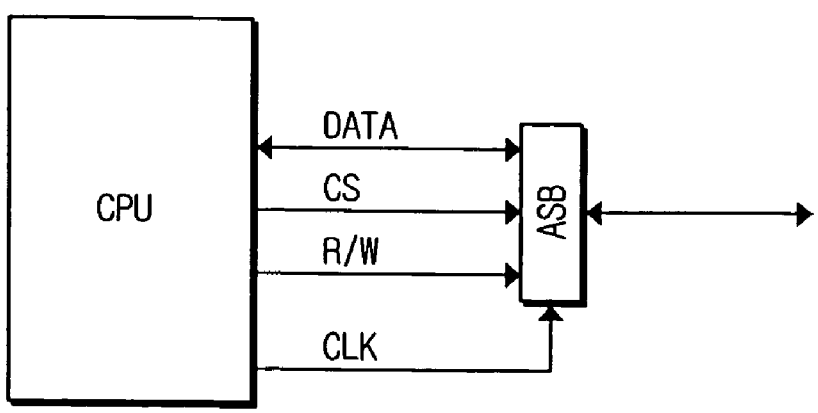

FIGS. 4A and 4B illustrate structures of the ASB 360 of FIG. 3 according to various embodiments of the present general inventive concept.

Referring to FIG. 4A, the ASB can be embedded in the CPU. The CPU and the embedded ASB are interconnected over an internal bus. As the CPU controls the ASB using the internal bus, the CPU is subjected to an increased load.

Referring to FIG. 4B, the ASB can be provided externally with respect to the CPU. The CPU and the ASB can be interconnected over a data bus, a CS (chip select) bus, a RAN (read and write) bus, and a CLK (clock) bus. The data bus communicates data between the CPU and the ASB. In further detail, the data bus forwards data (for example, status data) stored in the buffer of the ASB to the CPU, and forwards status data generated at the CPU to the buffer of the ASB.

The CS bus communicates CS signals between the CPU and the ASB to drive the ASB. The ASB turns on or off according to the received CS signals. The R/W bus communicates R/W signals between the CPU and the ASB to instruct the ASB to transfer data to the CPU or receive data from the CPU. In response to an R (read) signal, the ASB sends a control data stored in the ASB buffer. In response to a W (write) signal, the ASB receives a control data to the ASB buffer. The ASB synchronizes with the CPU by use of CLK signals received through the CLK bus.

Referring back to FIG. 3, the ASB 360 is connected to the devices 20'-60' using serial lines. The ASB 360 and the devices 20'-60' transmit and receive data over the serial lines. Herein, the data can be a control data having a small volume as described above. The ASB 360 transfers the control data to which an address of the device to receive the control data is included. The address may be appended in a front portion or a rear portion of the control data depending on a setting of a user.

Figure 5A:
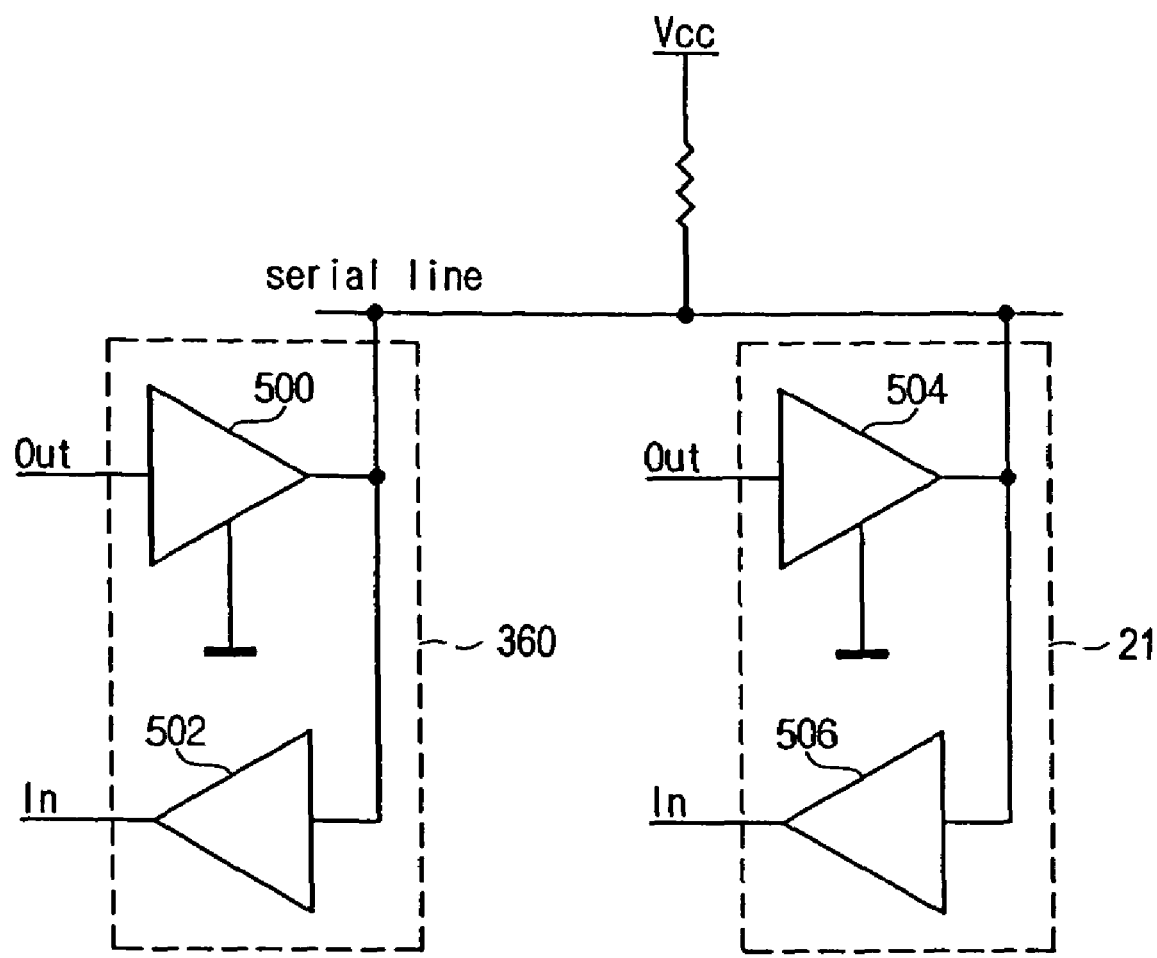
FIGS. 5A and 5B illustrate data being transferred between an ASB of a main controller and an ASB of a peripheral device according to various embodiments of the present general inventive concept.
Figure 5B:
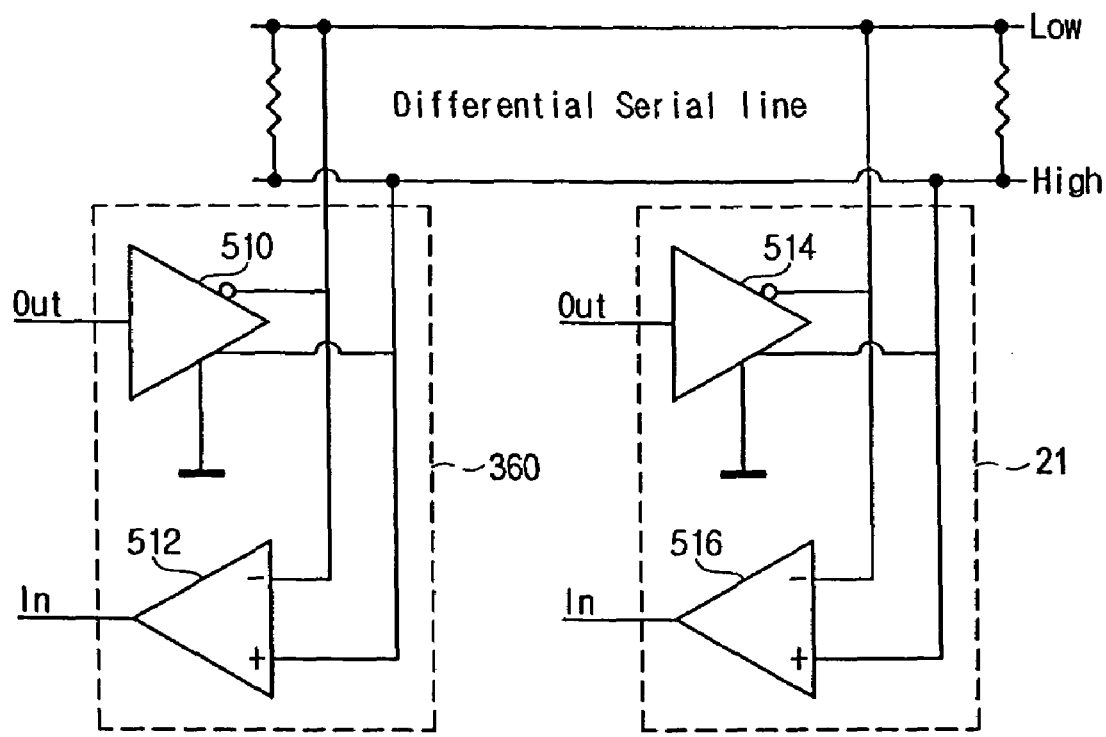

FIGS. 5A and 5B illustrate data being transferred between the ASB 360 of the main controller 300 and an ASB 21 of the first device 20' according to various embodiments of the general inventive concept. Although FIGS. 5A and 5B illustrate the ASB 360 of the main controller 300 communicating with the first device 20', the embodiments of the general inventive concept are not limited to the first device 20'.

Referring to FIG. 5A, data can be transferred between the ASB 360 of the main controller 300 and the ASB 21 of the first device 20' (i.e., a peripheral controller). As illustrated In FIG. 5A, the data can be transferred between the ASB 360 of the main controller 300 and the ASB 21 of the first device 20' over one serial line.

The ASB 360 of the main controller 300 includes first and second buffers 500 and 502. The ASB 21 of the first device 20' includes third and fourth buffers 504 and 506. Data transmitted from the ASB 360 of the main controller 300 to the ASB 21 of the first device 20' is transmitted from the first buffer 500 to the fourth buffer 506. Data transmitted from the ASB 21 of the first device 20' to the ASB 360 of the main controller 300 is transferred from the third buffer 504 to the second buffer 502. Accordingly, the ASB 360 of the main controller 300 and the ASB 21 of the first device 20' can transmit and receive data therebetween over one serial line.

Although two ASBs 360 and 21 are illustrated in FIG. 5A, three or more ASBs can also be interconnected, as illustrated in FIG. 3, using a wired-AND mechanism.

Referring to FIG. 5B, according to another embodiment of the present general inventive concept, the ASB 360 of the main controller 300 includes a first buffer 510 and a second buffer 512, and the ASB 21 of the first device 20' includes a third buffer 514 and a fourth buffer 516. A differential serial line having a high line to transfer a signal and a low line to transfer an inverted signal connects the ASBs 360 and 21 in this embodiment such that data can be stably transmitted over a long distance and noise can be reduced. The first buffer 510 of the ASB 360 of the main controller 300 transmits data and inverted data to the fourth buffer 516 of the ASB 21 of the first device 20', which subtracts the inverted data from the data. The third buffer 514 of the ASB 21 of the first device 20' transmits data and inverted data to the second buffer 512 of the ASB 360 of the main controller 300, which subtracts the inverted data from the data.

Figure 4C:
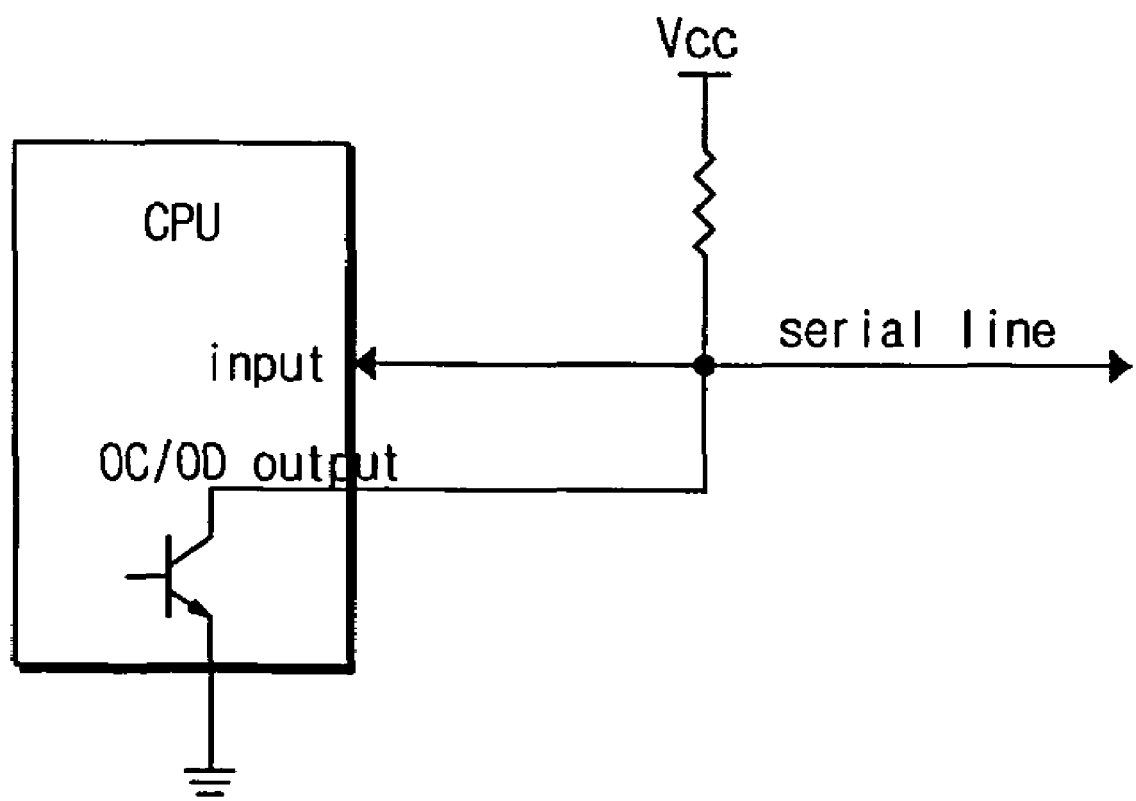

FIG. 4C illustrates that an ASB can be implemented using two general purpose parts of a CPU. Data is received from the device or transferred to the device using the serial line.

The foregoing explanations relate to a bus interconnection between devices in a MFP, but the embodiments of the present general inventive concept are not limited to this bus interconnection. It should be understood that a system including a general main controller and a plurality of general peripheral controllers can transfer or receive data over an ASB as described above.

According to various embodiments of the present general inventive concept, an ASB is assigned an address to reduce a load to a system bus interconnecting a CPU and other devices. The CPU is connected to other relevant devices over the address-assigned ASB. Therefore, the system bus can be realized in a simple structure, and overload to the system bus can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of interconnecting a main controller and at least two peripheral controllers using a bus in a control system, comprising:

assigning different addresses to the main controller and the at least two peripheral controllers, respectively;

interconnecting the main controller and the at least two peripheral controllers, to which the different addresses are respectively assigned, using one serial bus; and connecting an additional peripheral controller to the main controller using an additional bus to transmit and receive data having a volume exceeding a predetermined value between the additional peripheral controller and the main controller.

2. The method according to claim 1, wherein the serial bus forwards data in two directions between the main controller and the at least two peripheral controllers.

3. The method according to claim 1, wherein the main controller generates data containing an address assigned to a peripheral controller which receives the data, and transfers the generated data to the at least two peripheral controllers using the serial bus.

4. The method according to claim 3, wherein each of the at least two peripheral controllers operate as instructed by the received data when the address contained in the data received over the serial bus is the same as the respective assigned addresses, and each of the at least two peripheral controllers discard the received data when the addresses contained in the received data is different from the respective assigned addresses.

5. A method of communicating between a main controller having a main address serial bus (ASB) having a unique address and a plurality of peripheral controllers each having a peripheral ASB having a unique address, the method comprising:
transmitting data including a specified address from one of the main and peripheral ASBs, using one serial bus; and
receiving the transmitted data at each of the main and peripheral ASBs, using one serial bus, and comparing the received data with each of the unique addresses of the respective main and peripheral ASBs to determine one of the main and peripheral controllers to be operated.

6. A control system comprising:
a main controller to which a unique address is assigned;
at least two peripheral controllers interconnected with the main controller using one serial bus, and each assigned a unique address;
a central processing unit (CPU) to control the main controller; and
an address serial bus (ASB) connected with the at least two peripheral controllers and assigned the unique address of the main controller.

7. The control system according to claim 6, wherein the serial bus forwards data in two directions between the main controller and the peripheral controllers.

8. A control system comprising:
a main controller to which a unique address is assigned; and
at least two peripheral controllers interconnected with the main controller using one serial bus, and each assigned a unique address, wherein the at least two peripheral controllers each comprise:
an ASB to which the respective unique addresses are assigned.

9. A control system comprising:
a main controller to which a unique address is assigned;
at least two peripheral controllers interconnected with the main controller using one serial bus, and each assigned a unique address; and
an additional bus to connect the main controller with an additional peripheral controller that transmits and receives data having a volume exceeding a predetermined value to and from the main controller.

10. The control system according to claim 9, further comprising:
a bridge to connect the additional bus and the additional peripheral controller, which transmits and receives the data having the volume exceeding the predetermined value to and from the main controller, to the main controller.

11. A control system, comprising:
a main controller comprising a main address serial bus (ASB) having a unique address and a central processing unit (CPU) to transmit control data to and receive status data from the main ASB;
a plurality of peripheral devices, each comprising a peripheral ASB having a unique address assigned thereto to transmit data to the main ASB using the unique address of the main ASB and to receive the control data from the main ASB according to the unique address of the respective peripheral ASB; and
a single serial line to connect in serial the main ASB with each of the peripheral ASBs.

12. The control system according to claim 11, wherein the main ASB is embedded in the CPU of the main controller.

13. The control system according to claim 11, wherein the main controller further comprises:
a system bus to connect the main ASB to the CPU.

14. The control system according claim 13, wherein the system bus comprises:
a data bus to communicate data between the CPU and the main ASB;
a chip select bus to communicate chip select signals between the CPU and the main ASB;
a read and write bus to communicate read and write signals between the CPU and the main ASB; and
a clock bus to communicate clock signals from the CPU to the main ASB.

15. The control system according to claim 11, wherein the main ASB and each of the peripheral ASBs comprise:
a first buffer to drive a signal transmitted from the respective ASB; and
a second buffer to drive a signal from the respective ASB.

16. The control system according to claim 15, wherein the serial line comprises:
a differential serial line to transmit and receive signals therethrough, the first buffer of each of the main and peripheral ASBs capable of transmitting a signal and an inverse signal, and the second buffer of each of the main and peripheral ASBs capable of subtracting a received inverse signal from a received signal from the first buffer of another one of the main and peripheral ASBs.

17. The control system according to claim 11, wherein the CPU generates control data including a specific address corresponding to the address of one of the peripheral ASBs and transfers the control data to the main ASB, the main ASB transmits the control data to each of the peripheral ASBs, and the peripheral ASB having the specific address corresponding to the address included in the control data operates according to the control data.

18. The control system according to claim 11, wherein one of the peripheral ASBs transmits data including an address corresponding to the main ASB and the remaining peripheral ASBs, and the main ASB having the address corresponding to the address included in the data transfers the data to the CPU.

19. The control system according to claim 11, wherein when a signal is transmitted from one of the main and peripheral ASBs, each of the remaining main ASB and peripheral ASBs compares an address included in the transmitted signal to the unique address of the respective ASB and operates according to the comparison result.

20. The control system according to claim 19, wherein the ASB having the unique address determined to be the same as the address within the transmitted data operates according to the transmitted data.

21. A control system to communicate with a plurality of peripheral devices having addresses assigned thereto, comprising:

an address serial bus (ASB) to communicate with each of the plurality of peripheral devices in serial, and to connect to each of the plurality of peripheral devices using one serial bus, according to the assigned addresses of the plurality of peripheral devices; and a control unit to control the ASB to transmit and receive data to and from the plurality of peripheral devices through the ASB, wherein the ASB comprises an address assigned thereto to receive data from the plurality of peripheral devices.

22. The control system according to claim 21, further comprising:

a serial line to connect the ASB to the plurality of peripheral devices.

23. A method of interconnecting a main controller having a main serial bus and at least two peripheral controllers each having a peripheral serial bus, the method comprising:

assigning different addresses to the main controller and the at least two peripheral controllers, respectively; and interconnecting the main controller and the at least two peripheral controllers, to which the different addresses are respectively assigned, using the main serial bus.

* * * * *